Oct. 11, 1949.  F. R. QUINN  2,484,585
THERMAL RESPONSIVE RESISTANCE DEVICE
Filed Dec. 2, 1948
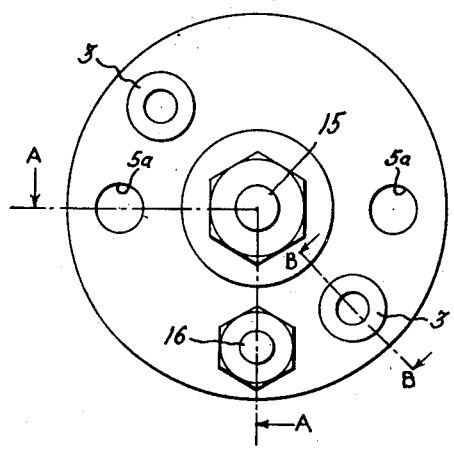
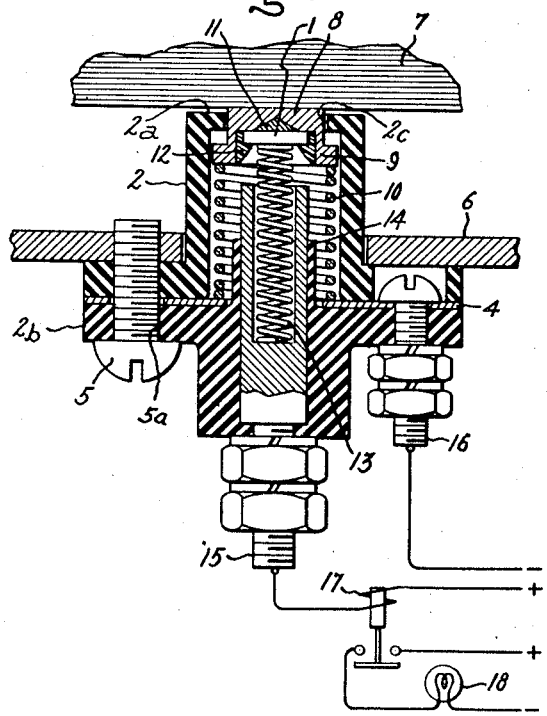
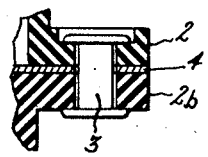
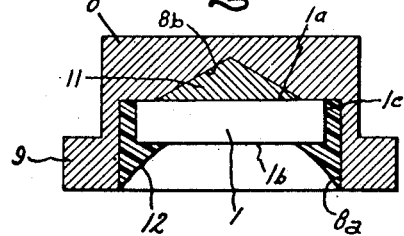
Inventor:
Frederic R. Quinn,
by Claude H. Matt.
His Attorney.

Patented Oct. 11, 1949

2,484,585

UNITED STATES PATENT OFFICE 2,484,585

THERMAL RESPONSIVE RESISTANCE DEVICE

Frederic R. Quinn, Schenectady, N. Y., assignor to General Electric Company, a corporation of New York Application December 2, 1948, Serial No. 63,028

4 Claims. (Cl. 201—63)

My invention relates to thermal responsive resistance devices, and more particularly to temperature sensitive resistance devices adapted to be mounted in thermal contact with the windings of a dynamoelectric machine for overload detection.

In the protection of aircraft generators and motors from current overloads, an accurate, instantaneous and inexpensive thermal detection device has long been desired. However, due to the varied spacial positions, the ambient temperatures, and the vibrations and pressures at which the thermal element must operate, it has been difficult to perfect such a detector and mount it without also providing for amplifiers, bridges, and other circuit elements, which, in addition to being expensive, all introduce a time delay into the effective circuit breaking action of said thermal detector.

Accordingly, it is an object of my invention to provide a new and novel thermal control and protective device for dynamoelectric machines which is rapid and accurate in operation, but which is inexpensive to manufacture and install, and which carries currents of a magnitude that will make unnecessary any amplifier, bridge, or other circuit element contributing to a time delay.

Another object of my invention is the provision of means for mounting and holding a thermal responsive resistance element in close thermal contact with the windings of a dynamoelectric machine at relatively high winding temperatures.

And still a further object of my invention is the provision of means to protect said thermal responsive resistance element from oil, water, dust, mechanical strain and vibration while still maintaining a good electrical connection between said element and other electric conductors.

A more complete understanding of my invention may be had by referring now to the following detailed description taken in connection with the accompanying drawing, in which Fig. 1 is an elevational view of a preferred embodiment of my device; Fig. 2 is a cross sectional view taken along line A—A of Fig. 1 showing an application of my invention to protect a dynamoelectric machine from overload; Fig. 3 is a cross sectional view taken along line B—B of Fig. 1; and Fig. 4 is a detailed enlargement of a portion of Fig. 2 showing the thermal responsive element mounted in a cup-shaped member. Similar elements in each figure have been given identical identifying numbers.

Referring to Figs. 2 and 4 of the drawing, I provide a thermal responsive resistance element 1 which is characterized by a high resistance when relatively cool and a low resistance when warm. This element, which preferably has a pair of substantially parallel surfaces 1a and 1b, and a side 1c joining said faces, may be a negative temperature coefficient thermal respons..e resistance element or thermistor of the type described and illustrated in Patent Number 2,414,792 issued on January 28, 1947, to Joseph A. Becker, the element preferably being in the form of a thin disk.

I coat the parallel faces of the thermal responsive element with a metallic low resistance electrically conducting substance, preferably silver, so that electrical contact can be made with the element, for no adequate electrical connection can be made with the element except through the coated faces. The substance chosen for coating should have no electrical or chemical reaction with the resistance element, and may be applied by any suitable method, such as applying a coat of a metal in liquid suspension to the parallel faces of the element and then heating to remove the suspension material and to leave a metallic coat adhering to the opposite faces of the resistance element. Only the parallel surfaces themselves are so coated, and the side 1c is left uncoated.

I mount the resistance element in a cup-shaped cylindrical housing 2 of electrically insulating material, this housing having an apertured end wall 2a at the bottom of the cup and an annular flange or lip at its open end. The element is mounted with no strain on metal coated surfaces 1a and 1b. For, it is to be understood that when warm, if strain is on the metal coated surfaces, the thermal element will break loose from the coated surfaces, and electrical contact with the heat responsive element itself is lost.

A circular cap 2b of electrically insulating material covers the flanged open end of the cup-shaped housing 2; and the cap and housing are fastened together, as by rivets 3 in said flange, Figs. 1 and 3, with an electrically conducting ring-shaped washer 4 between them.

Bolts 5 pass through bolt holes 5a in the flange of the housing 2 to permit attachment of the housing to the outer casing 6 of a dynamoelectric machine (not shown in entirety) to be protected. Attached by its flange to the outer side of the casing of the machine, the housing 2 extends within machine casing 6 toward the stator windings 7 of the machine, the length of the housing being such that it projects within a short distance, say $\frac{1}{16}$ of an inch, of the windings.

Within the housing 2 and protruding for a short distance through the aperture 2c in the apertured end wall 2a thereof, is the outer contacting portion of a thermal contact member, illustrated as a cup-shaped thermal contact member 8 made of electrical and thermal conducting material such as copper and having a recess 8a therein. The contacting portion of the member 8 extends far enough through the aperture 2c to make direct thermal contact with the windings 7 of the machine to be protected, and the member 8 is slidable in the aperture 2c and limited in outward movement by an annular flange or lip 9 thereon, which is arranged to engage the end wall 2a of the insulated housing 2 to prevent the member 8 from passing completely out of the housing 2 through the aperture 2c.

The thermal conducting member 8 is forced outwardly and into thermal contact with the windings 7 by an electrically conducting helical spring 10 seated at one of its ends against the flange 9 and at its other end against the conducting washer 4, thereby to form an electrical connection between the contact member 8 and the washer 4, and to allow telescoping movement of the contact member 8 to compensate for tolerances in the distance of the windings of different machines from the machine casing 6. The spring 10 also provides pressure to afford a good thermal contact between the machine windings and the contact means 8.

As shown in both Figs. 2 and 4, the thermal responsive resistance element 1 is held firmly in place within the recess 8a in the cup-shaped member 8, the element being of a size that an appreciable clearance is left between its side 1c and the walls of the recess of member 8. The thermal element 1 is mounted by holding the cup 8 so that the recess 8a opens to the top. A low temperature melting electrically conducting fusible material 11, as solder, is placed in a conical portion 8b in the bottom of the recess 8a. Sufficient fusible material is placed in the cup 8b so that when the solder is melted, the conical portion 8b is filled and a convex surface of the solder extends slightly above the portion 8b. The metallic coated face 1a of the element 1 is then pressed against the molten material 11 and the material 11 is allowed to cool, thereby shrinking slightly.

The metallic coated face 1a of thermal element 1 is held in flatwise engagement with the fusible layer of electrically conducting solder 11 when the solder cools, so assuring good thermal and electrical contact between the member 8 and the thermal element 1. The diameter of element 1 is such that its surface 1a completely covers the conical bottom recess 8b and bears against a shoulder formed between the upper and lower portions of the recess thus keeping solder 11 in the lower recess 8b. It should be understood that no deleterious effect would result if a thin film of solder should extend between the metallic face 1a of the element 1 and the area where the face 1a bears against the recess walls.

To hold the element 1 firmly in place as a cap covering the conical lower recess 8b and to electrically insulate the coated face 1b from the walls of the upper recess 8a, the remaining space between side 1c of the element 1 and the walls of the recess 8a within the member 8 is filled with an electrically insulating heat resistant bonding material 12 which forms a strong stable bond between the cup-shaped member 8 and the resistance element 1 under temperatures as high as 300° C. This thermal conducting bonding material, preferably a silicone resinous substance, such as organopolysiloxane resin, having a low coefficient of expansion, prevents the solder 11, if it should again become molten, from running around the edges of the element 1. For if the solder 11 should enter the interspace between the side 1c of the element 1 and the walls of the recess 8a of the member 8, it would change the resistance of the element 1, thereby changing the calibration of the entire device.

The bonding material 12 also prevents any oil, water, dust, or other foreign matter from intervening between the solder and the metallic coated face 1a of the thermal responsive element, thereby insuring good electrical contact between the face 1a and the fusible material 11. Preferably the bonding material is applied in putty or paste form and is hardened by heating.

A flange of bonding material 12 is extended to cover partially the metallic coated face 1b of the thermal responsive element, thereby to assure that face 1b is spaced apart and electrically insulated from the walls of the recess 8a. The flange also acts to more firmly bond the element 1 in place and remove any mechanical strain from the thermal element which might cause the metallic coat to slip off the coated faces. If the metallic coat slips off either the face 1a or the face 1b, no satisfactory electrical contact is made with the thermal element itself, so the change of resistance of the thermal element as its temperature increases does not produce the desired protective effect, as the appreciable drop in resistance when the thermal element heats up is not communicated to a series circuit including the fusible material 11 and a resilient or flexible electric conductor 13 respectively electrically connected to the metallic coat on the parallel faces 1a and 1b of the element 1.

The resilient conductor 13 may be a second electric conducting helical spring which is telescoped within the spring 10, and which is insulated from conducting spring 10 by a cylindrical insulator 14 also telescoped within the spring 10. The insulator 14 fits within the ring of the washer 4 and insulates the conductor 13 from the washer 4 as well as from the spring 10. The conductor 13 is positioned to bear at one end against the metallic coated face 1b of the thermal element 1 and at the other end against an electrical terminal connector 15 set in the cap 2b of insulated container 2. Another electrical terminal connector 16 is set in the container 2 and is attached to the conductor washer 4 which separates the two parts of container 2.

I have, therefore, provided an electrical series circuit from the terminal connector 16, through the washer 4, the conducting spring 10, the member 8 and the solder 11 to parallel coated face 1a of the resistance element 1. From the other coated face 1b of resistance element 1, the circuit includes the resilient conductor 13 and terminal connector 15. By connecting the energizing winding of a relay 17 to said terminals, a complete electrical series circuit is provided including the thermal responsive resistance element 1 in series with the energizing winding of the relay 17. A suitable source of current supply, such as a direct current supply source (not shown), is connected to energize the series circuit including the thermal responsive resistance element and the winding of the relay 17.

By this arrangement when the machine windings 7 are carrying current below a predetermined overload value, the resistance element 1 is relatively cool and offers a relatively high resistance to the flow of the energizing current. This high resistance blocks the flow of energizing current through the series electrical circuit including the winding of relay 17 and thermal responsive element 1. However, when the windings 7 carry current equal to or in excess of the predetermined overload current for said machine, windings 7 heat up and the resistance of element 1 drops, thereby allowing sufficient current to pass through the energizing winding of relay 17 to close the relay, so as to indicate, as by closing the circuit for lamp 18, that the dynamoelectric machine is overloaded.

While I have described and illustrated a particular embodiment of my invention, it will be understood, of course, that I do not wish to be limited thereto, since many modifications may be made, and I therefore contemplate by the appended claims to cover any such modifications as fall within the true spirit and scope of my invention.

What I claim as new and desire to secure by Letters Patent of the United States is:

1. A mounting for a thermal responsive resistance element having a pair of opposite parallel surfaces coated with a film of low resistance electrically conducting substance comprising, a thermal and electric conducting member having a recess therein, said recess having upper and lower portions with a shoulder therebetween, a body of fusible electric conducting material in the lower portion of said recess, said thermal responsive resistance element being positioned within said recess so that one of said coated surfaces is seated on said shoulder in engagement with said fusible material and the remainder of said element is spaced apart from the walls of said recess, and a body of electrically insulating bonding material filling said space between said element and the upper portion of said recess, thereby to retain said element firmly in position so that electrical contact can be made with each of said surfaces without mechanical strain on said surfaces.

2. A mounting for a thermal responsive resistance element comprising, a thermal and electric conducting member having a recess therein, said recess having upper and lower portions forming a shoulder therebetween, a body of fusible electric conducting material filling the lower portion of said recess to the level of said shoulder, a thermal responsive resistance disk having a pair of substantially parallel surfaces coated with a film of low resistance electrically conducting material positioned within said recess so that one of said coated surfaces is seated on said shoulder and in flatwise engagement with said fusible material and the remainder of said disk is spaced apart from the walls of said upper, and a body of electrically insulating material filling said space between said upper recess and said disk and partially covering the other coated surface of said disk, thereby to retain said disk firmly in position within said recess so that electrical contact can be made with each of said coated surfaces without mechanical strain on said surfaces.

3. A thermal responsive resistance device comprising, an insulating housing having an apertured wall and a first and second electrical terminal connector mounted on said housing, a thermal and electrical conducting member having a recess therein, said member being slidably mounted in said housing with a thermal contact portion protruding through said aperture, electrically conducting spring means within said housing resting between said first terminal connector and said member to force said member through said aperture and electrically connect said member to said first connector, means for limiting the outward movement of said member through said aperture, a thermal responsive resistance element having a first and a second substantially parallel face each coated with a low resistance electrically conducting substance, said element being disposed within said recess so that electrical contact is made between said first coated face and the walls of said recess and the remainder of said element is spaced apart from said recess walls, a body of thermally conducting electrically insulating bonding material filling said space between said recess walls and said element firmly to retain said element in position without strain on said coated surfaces, and electrical conducting means insulated from said spring means for passing an electric current from said second terminal connector to said second coated face.

4. A thermal responsive resistance device comprising, an insulating housing having an apertured wall and a first and a second electrical terminal connector mounted on said housing, a thermal and electrical conducting member having a recess therein, said member being slidably mounted in said housing with a thermal contact portion protruding through said aperture, an electrically conducting spring within said housing resting between said first terminal connector and said member to force said member through said aperture and electrically connect said member to said first terminal connector, means for limiting the outward movement of said member through said aperture, a body of electrically conducting fusible material positioned within the bottom of said recess, a thermal responsive resistance element having a first and a second substantially parallel face each coated with a low resistance electrically conducting substance, said element being disposed within said recess so that said first coated face is in flatwise engagement with said fusible material and the remainder of said element is spaced apart from the walls of said recess, electrically insulating heat resistant bonding material filling said space between said recess walls and said element and partially covering said second coated face of said element thereby to insulate said element remainder from said recess walls and to retain said element firmly in position without strain on either of said coated faces, and means including a resilient electrical conductor telescoped within said spring means and insulated therefrom for passing an electric current from said second terminal connector to the uncovered portion of said second coated face.

FREDERIC R. QUINN.

REFERENCES CITED

The following references are of record in the file of this patent:

UNITED STATES PATENTS

| Number | Name | Date |
|---|---|---|
| 1,835,582 | Allen | Dec. 8, 1931 |
| 2,113,610 | Bacon | Apr. 12, 1938 |
| 2,414,792 | Becker | Jan. 28, 1947 |

FOREIGN PATENTS

| Number | Country | Date |
|---|---|---|
| 788,259 | France | Apr. 9, 1934 |

Certificate of Correction

Patent No. 2,484,585                                                                                         October 11, 1949

FREDERIC R. QUINN

It is hereby certified that error appears in the printed specification of the above numbered patent requiring correction as follows:

Column 5, line 51, after the word "upper" and before the comma insert *recess*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*